US008265986B2

(12) United States Patent
Cheng et al.

(10) Patent No.: US 8,265,986 B2
(45) Date of Patent: Sep. 11, 2012

(54) SYSTEM AND METHOD FOR DETERMINING CARBON EMISSION-CONSCIOUS ORDER FULFILLMENT ALTERNATIVES WITH MULTIPLE SUPPLY MODES

(75) Inventors: Feng Cheng, Chappaqua, NY (US); Young Min Lee, Old Westbury, NY (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 12/245,441

(22) Filed: Oct. 3, 2008

(65) Prior Publication Data

US 2010/0088136 A1    Apr. 8, 2010

(51) Int. Cl.
| | |
|---|---|
| *G05B 19/418* | (2006.01) |
| *G06F 9/46* | (2006.01) |
| *G07B 15/00* | (2011.01) |
| *G07B 15/02* | (2011.01) |
| *G06G 1/14* | (2006.01) |
| *G06Q 20/00* | (2012.01) |

(52) U.S. Cl. .................. 705/8; 705/13; 705/22
(58) Field of Classification Search ............... 705/8, 13, 705/22
See application file for complete search history.

(56) References Cited

U.S. PATENT DOCUMENTS

| | | | | |
|---|---|---|---|---|
| 6,085,164 | A * | 7/2000 | Smith et al. ............ 705/5 |
| 6,115,649 | A * | 9/2000 | Sakata ............. 700/241 |
| 6,167,378 | A * | 12/2000 | Webber, Jr. ........... 705/7.25 |
| 6,705,523 | B1 * | 3/2004 | Stamm et al. .......... 235/385 |
| 6,892,104 | B2 * | 5/2005 | Patil et al. ............. 700/95 |
| 6,897,763 | B2 * | 5/2005 | Schulmerich et al. ...... 340/5.91 |
| 7,376,601 | B1 * | 5/2008 | Aldridge ................ 705/28 |
| 7,422,149 | B2 * | 9/2008 | Aptekar ............... 235/385 |
| 7,676,392 | B2 * | 3/2010 | Hedley et al. .......... 705/13 |
| 7,761,348 | B2 * | 7/2010 | Amling et al. .......... 705/28 |
| 7,797,205 | B2 * | 9/2010 | Song et al. ............. 705/28 |
| 7,853,536 | B2 * | 12/2010 | Amling et al. .......... 705/331 |
| 7,895,092 | B2 * | 2/2011 | Amling et al. .......... 705/28 |
| 7,912,754 | B2 * | 3/2011 | Tirinato et al. ......... 705/22 |
| 7,987,107 | B2 * | 7/2011 | Wilson et al. .......... 705/7.12 |
| 8,019,634 | B2 * | 9/2011 | Wegner et al. ......... 705/7.22 |
| 2002/0091579 | A1 * | 7/2002 | Yehia et al. ........... 705/26 |
| 2002/0103709 | A1 * | 8/2002 | Anthony et al. ......... 705/22 |
| 2002/0165804 | A1 * | 11/2002 | Beebe et al. ........... 705/28 |

(Continued)

OTHER PUBLICATIONS

Real world in house Activity, Fuel use and Emissions for Nonroad Construction Vehicles by Saeed AbdolHasani, Journal of the Air & Waste Mgmt Association, Aug. 2008, vol. 58, Issue 8, p. 1033 14pgs.*

(Continued)

*Primary Examiner* — Matthew Gart
*Assistant Examiner* — Harshad Parikh
(74) *Attorney, Agent, or Firm* — Scully, Scott, Murphy & Presser, P.C.; Daniel P. Morris, Esq.

(57) ABSTRACT

A system and method for optimizing order fulfillment by considering multiple supply modes in one aspect, plans supply of inventory by forecasting demand, estimating accuracy of said forecasted demand, and establishing reorder point policy based at least on said accuracy of said forecasted demand, a plurality of supply transportation modes, cost of carbon emissions and limit on carbon emission credits. Current inventory position is monitored and if the current inventory position is below the reorder point policy, orders are placed according to a selected shipping method. The selected shipping method may be based at least on customer order priority, transportation budget, and carbon emission limit.

20 Claims, 3 Drawing Sheets

U.S. PATENT DOCUMENTS

| | | | |
|---|---|---|---|
| 2003/0110104 A1* | 6/2003 | King et al. | 705/28 |
| 2003/0126024 A1* | 7/2003 | Crampton et al. | 705/22 |
| 2003/0172007 A1* | 9/2003 | Helmolt et al. | 705/28 |
| 2003/0177050 A1* | 9/2003 | Crampton et al. | 705/8 |
| 2004/0024644 A1* | 2/2004 | Gui et al. | 705/22 |
| 2004/0153379 A1* | 8/2004 | Joyce et al. | 705/28 |
| 2004/0162768 A1* | 8/2004 | Snyder et al. | 705/28 |
| 2004/0193470 A1* | 9/2004 | Nemoto et al. | 705/8 |
| 2005/0015164 A1* | 1/2005 | Loring et al. | 700/97 |
| 2005/0197876 A1* | 9/2005 | Benda et al. | 705/7 |
| 2005/0228705 A1* | 10/2005 | Irwin | 705/8 |
| 2005/0258961 A1* | 11/2005 | Kimball et al. | 340/572.1 |
| 2006/0085363 A1* | 4/2006 | Cheng et al. | 705/400 |
| 2007/0043601 A1* | 2/2007 | Oguchi et al. | 705/8 |
| 2007/0150367 A1* | 6/2007 | Yuasa et al. | 705/26 |
| 2008/0091581 A1* | 4/2008 | Kremen | 705/35 |
| 2008/0091589 A1* | 4/2008 | Kremen | 705/38 |
| 2008/0109337 A1* | 5/2008 | Dencer et al. | 705/35 |
| 2008/0116265 A1* | 5/2008 | Hanson | 235/383 |
| 2008/0177605 A1* | 7/2008 | Zimmerman | 705/7 |
| 2008/0183523 A1* | 7/2008 | Dikeman | 705/7 |
| 2008/0201255 A1* | 8/2008 | Green | 705/37 |
| 2008/0228665 A1* | 9/2008 | Gotthelf et al. | 705/36 R |
| 2008/0255999 A1* | 10/2008 | Toffey | 705/80 |
| 2008/0281663 A1* | 11/2008 | Hakim et al. | 705/8 |
| 2008/0306789 A1* | 12/2008 | Fell et al. | 705/7 |
| 2008/0306859 A1* | 12/2008 | Musier et al. | 705/37 |
| 2008/0319927 A1* | 12/2008 | Dallmier et al. | 705/400 |
| 2009/0082902 A1* | 3/2009 | Foltz et al. | 700/214 |
| 2009/0177505 A1* | 7/2009 | Dietrich et al. | 705/7 |
| 2009/0292617 A1* | 11/2009 | Sperling et al. | 705/26 |
| 2010/0088136 A1* | 4/2010 | Cheng et al. | 705/8 |
| 2010/0153192 A1* | 6/2010 | Hamilton et al. | 705/13 |
| 2011/0029446 A1* | 2/2011 | Benda et al. | 705/330 |
| 2011/0145030 A1* | 6/2011 | Allen | 705/7.12 |

OTHER PUBLICATIONS

Distance and backhaul in commodity transport modeling vy Joyce Smith Cooper, Int J life Cycle Assess (2008) 13:389-400.*

S. P. Sethi et al., Peeling Layers of an Onion: Inventory Model with Multiple Delivery Modes and Forecast Updates, Journal of Optimization Theory and Applications, Feb. 2001, pp. 253-281, vol. 108, No. 2.

Alan Scheller-Wolf et al., A Markovian Dual-Source Production-Inventory Model with Order Bands, GSIA, Carnegie Mellon University, Mar. 2, 1998, GSIA Working Paper No. 1998-E200, Pittsburgh, PA.

V. L. Zhang, Ordering Policies for an Inventory System with Three Supply Modes, Naval Research Logistics, 1996, pp. 691-708, vol. 43, No. 5.

* cited by examiner

SYSTEM AND METHOD FOR DETERMINING CARBON EMISSION-CONSCIOUS ORDER FULFILLMENT ALTERNATIVES WITH MULTIPLE SUPPLY MODES

CROSS-REFERENCE TO RELATED APPLICATIONS

This application related to U.S. application Ser. No. 12/051,697, filed on Mar. 19, 2008, which is incorporated by reference herein in its entirety.

FIELD OF THE INVENTION

The present application generally relates to optimization, and more particularly to a system and method for determining carbon emission-conscious order fulfillment alternatives with multiple supply modes.

BACKGROUND OF THE INVENTION

When a customer order is received at a facility such as distribution center, assembly center, or any other business that may receive orders, there are several ways of fulfilling the order. One method is to fulfill directly from the inventory of products or components or like, provided that sufficient inventory exists. In situations where there is not enough inventory to fulfill the order at the site that receives the order, the supply of items has to be shipped from another location, typically the supplier, to the fulfillment facility. For this situation, there can be more than one way of transporting the supply from the supplier to the fulfillment center (for example, distribution center). For instance, the goods may be shipped by premium air, ocean transportation, ground transportation, etc. Shipping by premium air may be faster than other methods but may cost more, and shipping by ocean transportation costs much less than premium air, but takes substantially longer. Further, the faster transportation mode is usually associated with higher carbon emission levels.

The following are some example ways for handling incoming orders: fulfill directly from the on-hand inventory of product or components (no lead time); fulfill from in-transit inventory (some lead time depending on where the shipment is); order a shipment from a supplier via fast transportation mode such as premium air transportation (short lead time, for example, 3-5 days, but with substantially high transportation cost and high carbon emissions); order a shipment from a supplier via slower transportation mode such as ocean freight (long lead time, for example, 5 weeks, however, less costly and producing less carbon emissions than premium air shipment).

The decision on which fulfillment alternatives to use depends on many factors such as requested ship date, service level agreement (SLA) for various customers, realized order/demand forecast, order backlog, customer and/or order priority, transportation costs, carbon emission limit and cost, and inventory levels or positions in the supply pipeline, that is, inventory on-hand, in-transit or on-order. To efficiently and profitably fulfill the orders, an optimal decision that considers and balances many factors need to be made. However, current methodologies do not provide practical and useful solution to the problem. For instance, standard inventory policies such as reorder point policy, which determines when to place an order for replenishing current inventory, and (s, S) policy, where s represents the inventory position which triggers re-ordering, and S represents target inventory which should be reached as a result of the re-ordering, do not consider multiple transportation modes. In general, no existing decision support system makes inventory replenishment decision and transportation decision jointly by minimizing the overall cost of both decisions. No standard industry practice is reported for joint inventory and transportation decision. Rather, the fulfillment decision is typically made by simple ad-hoe business rules.

Recent research described in Sethi, Yan, and Zhang, "Peeling Layers of an Onion: Periodic Review Inventory Model with Multiple Delivery Modes and Forecast Updates," Journal of Optimization Theory and Applications, Vol. 108, pp. 253-281, 2001 ("Sethi et al."); Zhang, "Ordering policies for an inventory system with three supply modes," Naval Research Logistics, Vol. 43, No. 5, pp. 691-708, 1996 ("Zhang"); and Scheller-Wolf and Tayur, "A Markovian Dual-Source Production-Inventory Model with Order Bands," GSIA Working Paper No. 1998-E200, Carnegie Mellon University, 1998 ("Scheller-Wolf et al."), extended the standard model in the literature by allowing multiple delivery modes. However, the solution methods proposed in Sethi et al. and Zhang are based on periodic planning models with assumptions that the transportation lead times must be consecutive. The decision rules derived from the existing methods typically deal with stationary demand only. They do not take into account the different demand priorities of orders. Furthermore, inventory decisions in Scheller-Wolf et al. are made based on the inventory position only, without analyzing the pipeline inventory information at each stage of the supply chain.

The existing methodologies also do not take into account environmental considerations in their supply planning. For instance, different modes of transportation such as a container shipping vessels, rail or trains, trucks and airplanes have different carbon dioxide or like harmful chemical emission levels, which may contribute to the currently much debated global warming phenomena. Ocean shipments, for example, may result in less emission of carbon dioxide or other harmful chemical or material into the environment than air shipments. A carbon emission conscious fulfillment decision will need to take into account the overall consideration based on various factors, i.e., service level committed to the customer, transportation cost, and the carbon emission limit and associated cost.

BRIEF SUMMARY OF THE INVENTION

A system and method for optimizing order fulfillment by considering multiple supply modes are provided. The method in one aspect may comprise planning supply of inventory. Planning supply of inventory comprises at least, forecasting demand, estimating accuracy of said forecasted demand, and establishing reorder point policy based at least on said forecasted demand and its accuracy, a plurality of supply transportation modes, cost of carbon emissions and limit on carbon emission credits.

A system for optimizing order fulfillment by considering multiple supply modes, in one aspect, may comprise a collection module operable to collect and analyze carbon emission data associated with a plurality of supply transportation modes. A planning process module is operable to at least forecast demand, estimate accuracy of said forecasted demand, and establish reorder point policy based at least on said accuracy of said forecasted demand, the plurality of supply transportation modes, cost of carbon emissions and carbon emission budget to plan supply of inventory. An order execution module is operable to run concurrently with said planning process module, and further operable to fill one or more orders received from a customer using said supply of inventory.

The planning process module and the order execution module may be software, hardware or circuit, firmware, or like and may be run on or with a processor such as a central processing unit (CPU) or core on a computer system.

A program storage device readable by a machine, tangibly embodying a program of instructions executable by the machine to perform a method of optimizing order fulfillment by considering multiple supply modes may be also provided.

Further features as well as the structure and operation of various embodiments are described in detail below with reference to the accompanying drawings. In the drawings, like reference numbers indicate identical or functionally similar elements.

DETAILED DESCRIPTION

Carbon credits are a kind of permit that allows an entity to emit or release up to a specified amount of carbon dioxide or greenhouse gases or like harmful material, and implemented to mitigate global warming believed to be occurring due to the greenhouse effect, i.e., excessive greenhouse gases that raise the temperature of the earth to lethal levels. Greenhouse gases are produced by many natural and industrial processes. Each operator of those processes has an allowance of credits, referred to as carbon credits. Each unit of carbon credit allows the owner to emit a predetermined amount, for example, one metric tonne of carbon dioxide or other equivalent greenhouse gas. In this disclosure, carbon credit that the owner has is also referred to as carbon budget. Carbon credits may be traded and marketed among businesses. Carbon credits place monetary value to emissions. For example, it costs a business entity $X in USD when the business produces Y units of carbon dioxide into the environment, for instance, as a byproduct of running its business.

System and method are provided that fulfill orders while maximizing the revenue generated by fulfilling customer orders and/or minimizing the overall cost such as inventory cost and transportation cost subject to one or more service level constraints and carbon budget or carbon credit. The system and method may consider one or more of the following factors: Customer Requested Ship Date; Customer (order) priority; Service Level Agreement (SLA) for various customers; Transportation costs (for various transportation modes); Budget for transportation expense; Realized orders/demand forecast, order backlog; Inventory positions (e.g., on-hand, in-transit and on-order minus the backorders); Allowed carbon credits; and budget for carbon emission cost, clean up cost or carbon offset cost.

The system and method may maximize revenue of said fulfillment decision; maximize profitability of said fulfillment decision; minimize liability costs for under-utilizing said inventory; minimize penalty costs for violating desired customer services levels; and minimize penalty costs for deviating from desired priorities of order fulfillment of customer orders, while considering carbon budget in deploying various forms of transportation that emit carbon dioxide or other greenhouse gases.

Figure 1:
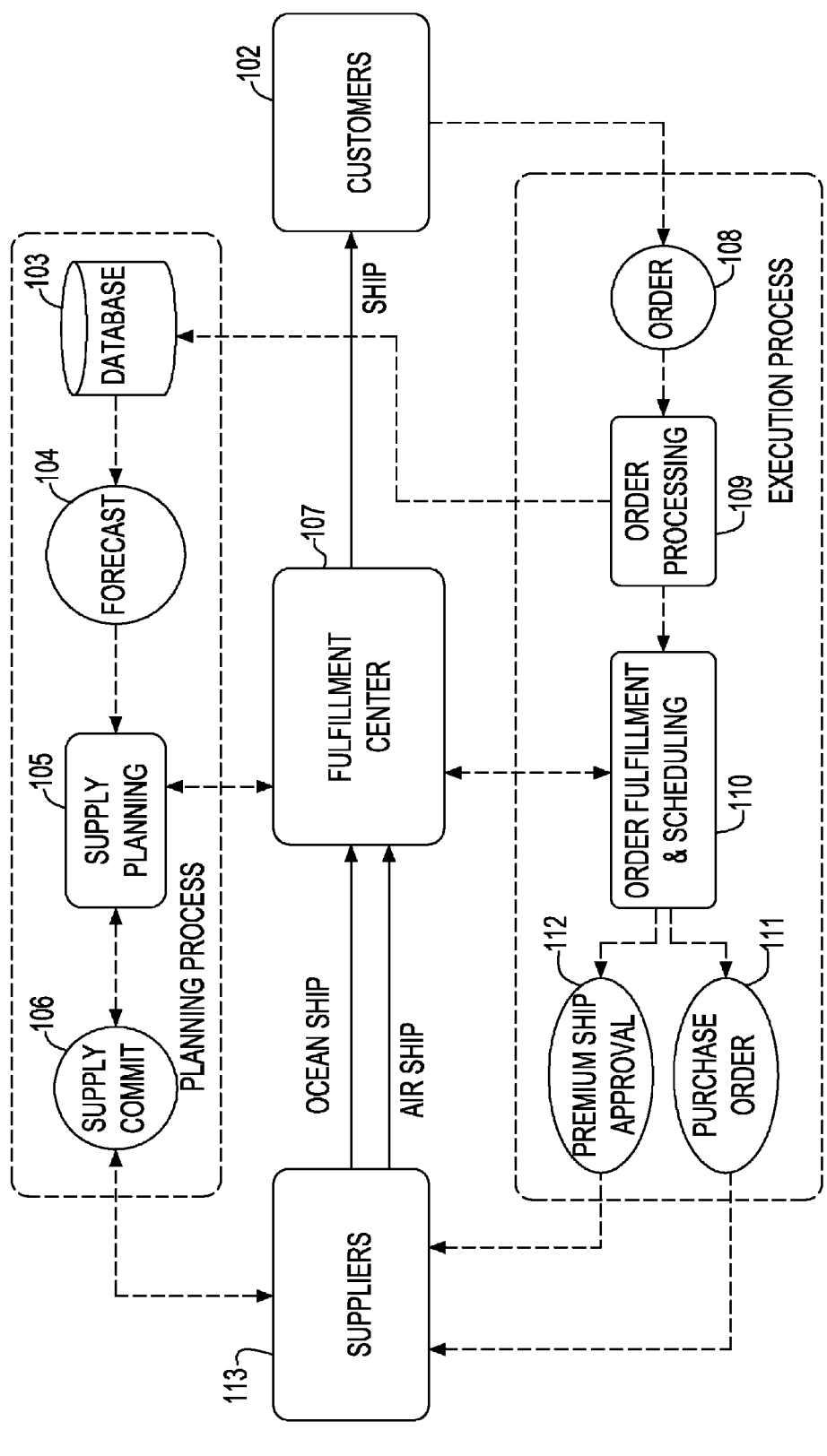
FIG. 1 illustrates a process flow in one embodiment of the present disclosure for optimizing order fulfillment.

FIG. 1 illustrates functional components of a system in one embodiment of the present disclosure for optimizing order fulfillment. A supply chain operation may comprise two sub-processes: planning and execution. The planning process includes demand forecasting (104) which may be based on historical order data (103) and other considerations, and supply planning (105) that creates a supply commitment (106) from components suppliers (113). Briefly, demand forecasting refers to estimating future customer orders or demands. The execution process, in one embodiment, includes order processing (109), executed for instance, after orders (108) are received from customers (102). Functional module shown at (110) handles the order fulfillment and scheduling according to the method and system of the present disclosure in one embodiment.

Figure 2:
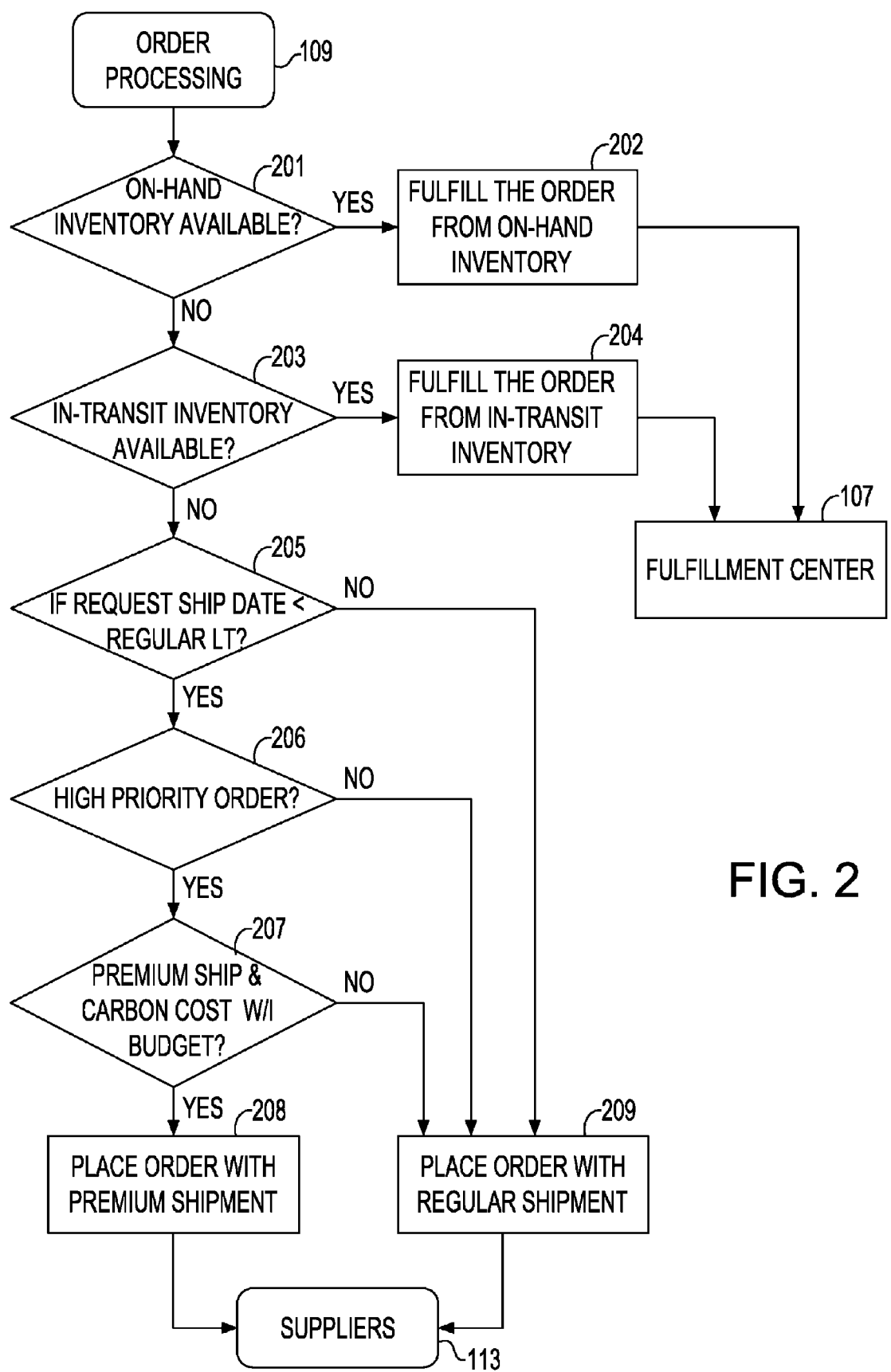
FIG. 2 is a flow diagram illustrating a method in one embodiment for the order fulfillment and scheduling process of the present disclosure.

The planning process may be a periodical process, for example a biweekly process, while the execution process may be a continuous process. For example, the execution may be a continuous or daily process since orders may be received continuously and processed either continuously or daily. Planning may be performed periodically, for instance, once every week or every two weeks, based on the most up-to-date information at the time. The two processes may synchronize periodically, for example, every two weeks. Between two planning cycles, the supply or production plan may be fixed temporarily. The functional details of module (110) in one embodiment are shown in FIG. 2. The outputs of module (110) may include the purchase orders (111) sent by the fulfillment center (107) to the suppliers (113) and the premium ship approvals (112), which authorize the use of air shipments.

FIG. 2 is a flow diagram that illustrates a method in one embodiment for the order fulfillment and scheduling module 110 in FIG. 1). The inventory level (or on-hand inventory level) in this disclosure refers to the amount of physical inventory available for fulfilling customer demand immediately at a given inventory stocking location. The inventory position is the on-hand inventory plus the in-transit inventory minus backorders. In-transit inventory refers to the amount of inventory that has been ordered but has not arrived. A backorder is the portion of demand that is not fulfilled immediately because the on-hand inventory is out of stock. After the order is processed at 109 to verify and confirm the various attributes associated with the order including, for example, the requested ship date, the desired service level, the order priority, etc., it is determined whether there is sufficient inventory available on-hand to fulfill the order at step 201. If inventory is available on-hand, the order is fulfilled from the on-hand inventory at step 202. Otherwise, it is checked at step 203 to determine if there is sufficient inventory available in transit (being shipped to the fulfillment center from supplier). If the in-transit inventory is available, the order is fulfilled from in-transit inventory at step 204. If not, a shipment order has to be placed to order supply from a supplier. In this situation, an optimal order fulfillment decision is made by taking into account the requested ship date at step 205 and the priority of the order at step 206, and at step 207, by considering available multiple supply transportation modes and the cost of carbon emission associated with the multiple supply transportation modes.

Thus, in one embodiment of the method of the present disclosure, it is checked at step 205 to determine whether the requested ship date is less than the lead-time (LT) of regular shipment, that is, whether there is enough time before the requested ship date for the shipment to arrive. A regular shipment refers to a standard, normal or usual shipment route taken for shipments of supplies. A greater lead-time compared to the requested ship date implies that the customer will not be able to receive the supplies within the requested time. If at step 205, it is determined that the requested ship date is less than the regular lead-time for shipment, at step 206, it is determined whether the order is of high priority. Whether an order is of high priority may have been set previously using some criteria or threshold. The customer also may set the priority when placing the order. At step 206, if it is determined that the order is of high priority, then at step 207 it is determined whether premium shipping is available and can be approved. A premium shipping refers to transportation method that is faster or takes less time than the regular shipping. The approval decision to use the premium shipping takes into consideration the cost of carbon emission associated with the premium shipping. For example, if the cost of carbon emission that is incurred by using the premium shipping is within the limit of business's carbon credit or budget, that premium shipping mode may be approved. The data associated with carbon emission with respect to different types of transportation or transportation modes may be collected and analyzed. An entity, for example, may have a database of updated information about carbon emission for the types of transportation.

If a premium ship order is needed and approved, then the order will be placed at step 208 using premium shipping method (e.g., air shipment). Otherwise regular order will be placed, for example, using ocean or surface (ground) transportation method at step 209. In one embodiment, this process may be applied to every order that is received by the fulfillment center.

In one embodiment, at step 205, if it is determined that the requested ship date is not less than the LT of regular shipment, that is, a normal or usual shipment route, the order may be placed through regular shipment as shown at step 209. Likewise, at step 206, if it is determined that the order does not have high priority, the order may be placed through the regular shipment at step 209. Also at step 208, if there was no premium method of shipping available or such method of shipping has not been approved, the order may be placed through the regular shipment at step 209.

Figure 3:
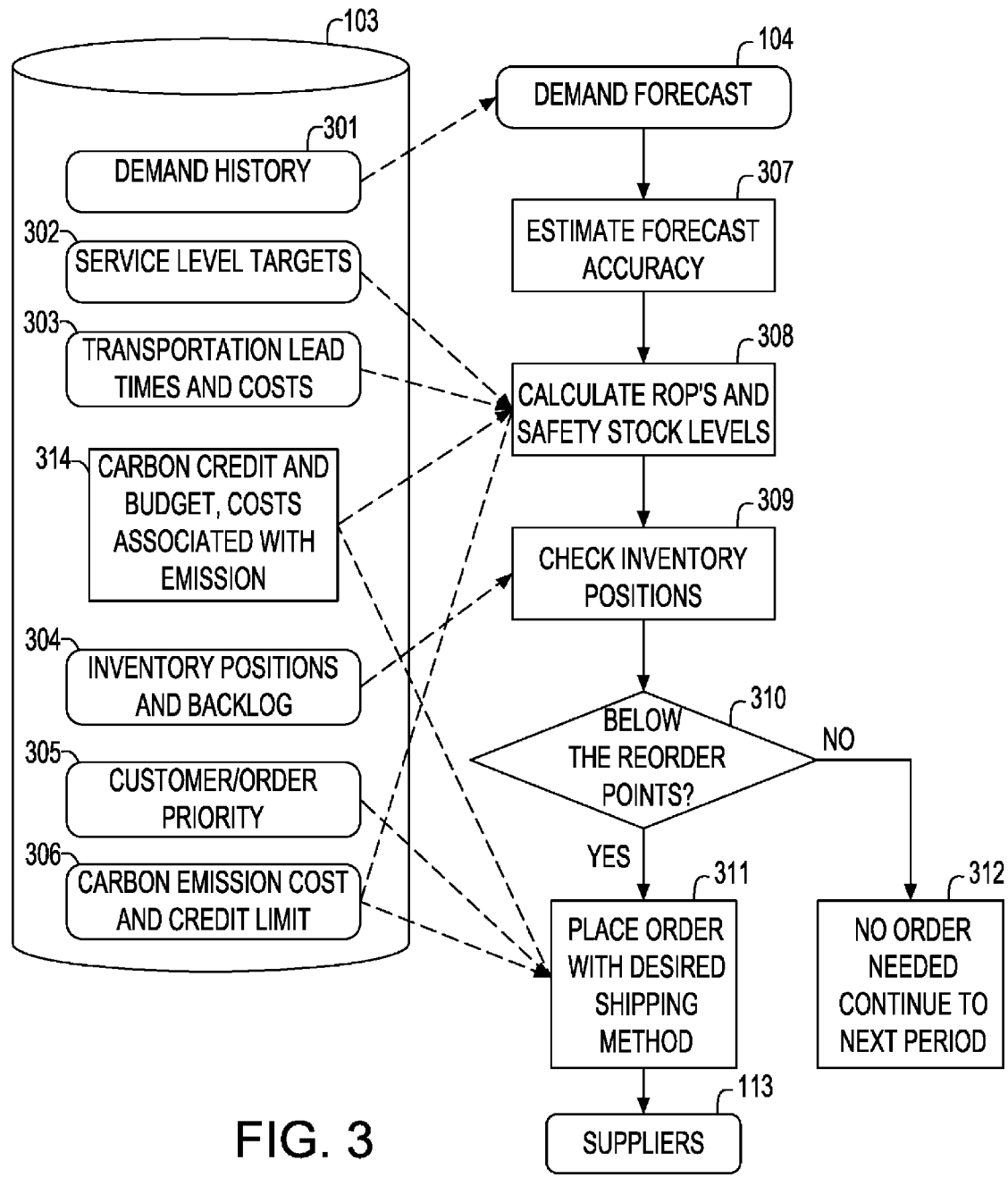
FIG. 3 is a flow diagram illustrating a method in one embodiment for the supply planning and inventory optimization of the present disclosure.

FIG. 3 is a flow diagram illustrating a method in one embodiment for the supply planning (for example, shown in FIG. 1 105) and inventory optimization of the present disclosure. A demand/supply planning process may be established in place, and for example, at the same time the execution process is in progress, the demand/supply planning process may monitor and forecast demand (demand forecast (104)). Monitoring and forecasting demand (104) may include analyzing historical order data (103) and other considerations. The demand/supply planning process further estimates and updates the forecast accuracy at step 307 based on the analysis and/or demand history (301).

One preferred operational policy for inventory control in this embodiment is so-called reorder point policy or base-stock policy, which uses an established reorder point (ROP) as a threshold for determining whether an order to the supplier should be placed. The ROP may include two quantities. One quantity is the expected total demand within the transportation lead-time. The other is the so-called safety stock which is the amount of additional inventory required to cover the expected demand variability within the transportation lead-time for a given service level target. Briefly, service level target is a desired level of service to be achieved for a customer. Such service level target may have been agreed upon between the vendor and the customer, for instance, via service level agreements. In another aspect, service level target may based on a company policy for meeting customer satisfaction, etc. Thus, at step 308, ROPs including safety stock levels are updated using parameters or data such as the service level targets (302) and transportation lead-times and costs (303), and costs associated with carbon dioxide or other greenhouse gas or like harmful emissions (314). At step 309, inventory positions are checked using inventory positions and backlog data (304). If the inventory levels (or inventory positions) are found at step 310 to be below the optimal reorder points, at step 311, new replenishment orders using either regular or premium transportation mode or combination of the two modes or any other transportation modes as determined for example using customer/order priority data (305), transportation budget data (306) and costs associated with carbon dioxide or other greenhouse gas or like harmful emissions (314) are established at step 311 to bring the inventory to the desired levels. If at step 310 it is determined that the inventory levels are not below the optimal reorder points, at step 312 a decision is made that no order is needed at this time.

The determination of the reorder points involved in step 308 may comprise a plurality of steps according to the method and system of the present disclosure. The steps in one embodiment are described below in detail.

Consider an example of a discrete time, single product, periodic review inventory system. The dynamics of the system contains two parts: the material flows and the information flows. The inbound material flows can come from different supply sources (as a simple example, two supply sources—fast and slow), and the outbound material flows to the customers. The information flows include the demand forecast, and the realized customer demand. At the beginning of each period, the forecast of the demand or the demand forecast is updated. The customer demand materializes or realizes at the end of the period. When the realized customer demand occurs at the end of the period, the customer demand is satisfied if there is sufficient available inventory, and the excess is carried over to the next period. Otherwise, the customer demand is partially satisfied to the extent of available inventory and the unsatisfied demand is fully backlogged.

The decision variables associated with determination of reorder points (ROPs) are the quantities ordered from the fast and slow sources at the beginning of each period. The ordering decisions are made based on the current inventory position and the current (updated) demand information.

A constraint optimization model is bolt that minimizes the weighted overall cost, i.e., inventory cost, transportation cost and cost due to carbon emissions, subject to, for example, the service level constraints and impact of carbon emissions from transportation. The optimization model at the same time maximizes the revenue or profit taking into consideration the customer buying preference for green or eco-friendly products.

The modeling in the present disclosure takes into account the features such as carbon footprints that differ by transportation modes, trade-offs between carbon emission and transportation lead-time; and optimizes multi-objective with weighing factors reflecting the prioritized objectives. For example, minimizing inventory cost and minimizing carbon emission cost are two different objectives modeled in the present disclosure. Objectives can have weighing factors as desired. For example, one can give the carbon emission cost a higher weight so that carbon emission cost will be the major cost component, providing a solution that is in favor of carbon emission reduction. Thus, objectives such as reducing the carbon emission cost, reducing the inventory cost, and improving the service level can be prioritized as desired. That is, one objective may be given higher priority or weight so the solution would favor that particular objective.

In one aspect, the objectives in the model are non-linear. That is, the objective function is not a linear function of the variables. A linear objective function changes with the variables proportionally. Otherwise, the objective function is a nonlinear function of the variables. For example, when the amount of emission increases by n times, the associated cost may increase by more than n times. The cost is a nonlinear function of the carbon emission. Another example can be illustrated for the case of transportation. The pricing scheme for shipping is typically based on the weight of the shipment. The price can be a step function of weight, a fixed price for shipment with weight below a certain level.

The following notations are used in the model in one embodiment.

M: set of existing products indexed by m
J: set of product groups, indexed by j
$A_j$: set of product i in product group $j \in J$
t: time index for a period, t=1, ..., T (T is the number of periods)
$D_{mt}$: demand forecast for product m in period t $$D_m(1, t) := \sum_{s=1,...t} D_{ms}$$

cumulative demand forecast for product m $X_{mt}^k$: fulfillment quantity for product m using supply mode k in period t $X_m^k(1,t)$: cumulative fulfillment quantity for product m using supply mode k in period t $c_m^k$: carbon emission cost for each unit of product m using supply mode k $C_j^{max}$: carbon emission limit for transportation of product group j $h_m$: inventory cost for each unit of product m per period $\alpha_m$: serviceability target for product m The model generates a fulfillment plan that minimizes the sum of inventory costs and carbon emission costs subject to carbon emission limits and service level requirements based on demand forecasts.

In one embodiment of the present disclosure, in order to determine the reorder points shown at 308, the forecast for future demand and the estimated accuracy of the forecast need to be obtained. In one aspect, the demand forecast may be obtained by analyzing the historical demand forecasts along with the corresponding actual demands. Statistical methods for estimating probability distributions, i.e., mean and standard deviation, for instance, are found in the literature and commercial software, and may be utilized to obtain and update the forecast for future demand.

Forecast accuracy may be estimated at step 307, for instance, using the following definition or formula. Other methods may be employed for determining the forecast accuracy. For a given time period t, consider a family of N products. Let $y_1, y_2, ..., y_N$ denote the demand (orders) in units for the N products. These are the actual values and $y_j \geq 0$ for all j. Let $f_1, f_2, ..., f_N$ be any set of forecasts made for the N product demands at time prior to t. Consequently, $e_1=|y_1-f_1|$, $e_2=|y_2-f_2|$, ..., $e_N=|y_N-f_N|$ are the forecast errors. Note that the time period is fixed, so the subscripts represent different products, not time periods. The forecast error is given by $$E = \sum_{j=1}^{N} e_j = \sum_{j=1}^{N} |y_j - f_j|.$$

The corresponding forecast accuracy is defined as $$A = \begin{cases} 1 - E / \sum_{j=1}^{N} y_j & \text{if } E / \sum_{j=1}^{N} y_j < 1 \\ 0 & \text{otherwise} \end{cases}$$

The computation of step 308 may involve the following steps. For the convenience of analysis, it is assumed that the random demand $D_{mt}$ follows a normal distribution with the mean $\mu_{mt,t}$ being the forecast and the standard deviation $\sigma_{mt}$ being the forecast error for product m, i.e., $D_{mt}=\mu_{mt}+\sigma_{mt}Z_t$, where $Z_t$ is a random variable with the standard normal distribution.

Here it is assumed that the demand not met immediately from inventory is backlogged and fulfilled when inventory becomes available.

The objective of the problem is to minimize the expected total cost incurred including ordering, transportation costs and carbon emission costs associated with the orders (shown at 303) and other cost information including inventory holding costs, and backlog costs, i.e., $$\min \sum_{m=1}^{M} \left( \sum_{k=1}^{2} c_m^k X_m^k(1, T) + \sum_{t=1}^{T} h_m E\left[ \sum_{k=1}^{2} X_m^k(1, t-l_k) - D_m(1, t) \right]^+ \right)$$

subject to the following constraints:

$$\sum_{m \in A_j} \sum_{k=1}^{2} c_m^k X_m^k(1, T) \leq C_j^{max} \text{ for all product groups } j \in J$$

$$P\left[ \sum_{k=1}^{2} X_m^k(1, t-l_k) \geq D_m(1, t) \right] \geq \alpha_m \text{ for all } m \in M \text{ and } t = 1, ..., T$$

T is the total number of periods in the planning horizon. $X_m^k(1,T)$ is the total order quantity for product m using supply mode k.

The objective function above consists of two cost terms. The first term is the sum of the transportation costs and carbon emission costs for all orders made during the planning horizon. The second term is the sum of inventory costs incurred during the same planning horizon. The first constraint means that the total amount of carbon emissions must be no greater than the limit set for the planning horizon. The second constraint means the service level for the customer orders must be equal to or greater than the desired target level.

Here E represents expected value calculation for the objective function shown above. The objective function uses the forecast accuracy (in terms of mean and standard deviation for normally distributed random variable) that is computed at 307, and P ( ) is the conditional probability of satisfying service level constraints. P is estimated using forecast error, which is equivalent of forecast accuracy, A, computed above.

By applying the following mathematical transformation $$x_{m,t}=X_m^1(1,t), y_{m,t}=X_m^1(1,t)+X_m^2(1,t),$$

$$\mu_{m,t}=\mu_m(1,t), \sigma_{m,t}=\sigma_m(1,t), K_m=\Phi^{-1}(\alpha_m),$$

we can rewrite the objective function as $$\min \sum_{m \in A_j} c_m x_{m,T} + \sum_{t=1}^{T} \sum_{m \in A_j} h_m \sigma_{m,t} H\left(\frac{y_{m,t} - \mu_{m,t}}{\sigma_{m,t}}\right)$$

with the following constraints:

$$\sum_{m \in A_j} x_{m,T} \leq C_j^{max}$$

$y_{m,t} \geq \mu_{m,t} + k_m \sigma_{m,t}$ for all $m \in A_j$ $x_{m,t} \leq y_{m,t}$, $x_{m,t} = y_{m,t}$, $t=1, \ldots, l-1$ $y_{m,t} = y_{m,t-1} + x_{m,t}$, $t=T-l, \ldots, T$ $x_{m,t} \leq x_{m,t+1}$, $y_{m,t} \leq y_{m,t+1}$ Note that $\Phi$ is the standard normal distribution function ($\phi$ is the standard normal density function), $\Phi^{-1}$ is the inverse function of $\Phi$, and $H(x) = \Phi(x) + x\phi(x)$.

The interpretation of the objective function and the first two constraints in the new formulation is the same as for the original formulation of the problem. The rest of the constraints used in the new formulation represent the relationships between the variables.

The original problem is separable by period and by product group. The sub-problems after decomposition are solvable using a recursion algorithm. The recursion algorithm starts at t=T and continues backwards. Each sub-problem has a convex objective function with linear constraints. The convex program problem with linear constraints can be solved using a greedy algorithm and/or linear programming ("LP") solver with piecewise linear approximation.

The method of the present disclosure generalizes the standard reorder point policy to the following threshold-type inventory policy by incorporating the special structure of the new model.

Specifically, a base-stock policy is used for the ordering decision. We let $R_{mt}^k$ be the reorder point for $X_{mt}^k$, k=1,2, and m∈M.

Hence the order quantity is given by $$X_{mt}^k = \begin{cases} R_{mt}^k - w_{mt}^k, & w_{mt}^k < R_{mt}^k, \\ 0, & \text{otherwise,} \end{cases}$$

where k=1,2, and m∈M, $w_{mt}^1$ is the inventory position of product m at the beginning of period t, and $w_{mt}^2$ is the inventory position of product m after the order using supply mode 1 in period t is made.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer and/or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer implemented method for optimizing order fulfillment by considering multiple supply modes, comprising:

planning supply of inventory, by a processor, said step of planning supply of inventory comprising at least, forecasting demand, estimating accuracy of said forecasted demand, and establishing reorder point policy based at least on said accuracy of said forecasted demand, a plurality of supply transportation modes, cost of carbon emissions and limit on carbon emission credits, wherein an objective function is modeled to solve for the reorder point policy and the reorder point policy includes reorder points comprising quantities ordered using different supply modes, wherein the objective function minimizes inventory cost and the cost of carbon emission and wherein the objective function enables prioritizing one or more of reducing the cost of carbon emissions or reducing the inventory cost, wherein the reorder point policy comprises reorder points determined by solving a minimization function, $$\min \sum_{m=1}^{M} \left( \sum_{k=1}^{2} c_m^k X_m^k(1,T) + \sum_{t=1}^{T} h_m E\left[ \sum_{k=1}^{2} X_m^k(1, t - l_k) - D_m(1,t) \right]^+ \right)$$

subject to constraints $$\sum_{m \in A_j} \sum_{k=1}^{2} c_m^k X_m^k(1,T) \leq C_j^{max} \text{ for all product groups } j \in J,$$

$$P\left[ \sum_{k=1}^{2} X_m^k(1, t - l_k) \geq D_m(1,t) \right] \geq \alpha_m \text{ for all } m \in M \text{ and } t = 1, \ldots, T$$

wherein,

T represents total number of periods in a planning horizon, $X_m^k(1,T)$ represents total order quantity for product m using supply mode k, M represents a set of existing products indexed by m, J represents a set of product groups indexed by j, $A_j$ represents a set of product I in product group $j \in J$, t represents time index for period, t=1, ..., T, where T represents number of periods, $D_{mt}$ represents demand forecast for product m in period t, $$D_m(1,t) := \sum_{s=1,\ldots t} D_{ms}$$

cumulative demand forecast for product m, $X_{mt}^k$ represents fulfillment quantity for product m using supply mode k in period t, $X_m^k(1,t)$ represents cumulative fulfillment quantity for product m using supply mode k in period t, $c_m^k$ represents carbon emission cost for each unit of product m using supply mode k, $C_j^{max}$ represents carbon emission limit for transportation of product group j, $h_m$ represents inventory cost for each unit of product m per period, $\alpha_m$ represents serviceability target for product m.

2. The method of claim 1, wherein said step of establishing reorder point policy includes establishing reorder point policy based at least on said accuracy of said forecasted demand, a plurality of supply transportation modes, service level target, the cost of carbon emissions and the limit on carbon emission credits.

3. The method of claim 1, wherein said step of planning supply of inventory further includes:
replenishing current inventory to meet said reorder point policy, and based on said limit on carbon emission credits.

4. The method of claim 3, wherein said step of replenishing includes:
selecting a shipping mode from a plurality of shipping modes based on transportation budget and amount of carbon emission of the plurality of shipping modes.

5. The method of claim 3, wherein said step of replenishing includes:
selecting a shipping mode from a plurality of shipping modes based on priority of orders from a customer.

6. The method of claim 1, further including:
receiving one or more orders from a customer;
filling said one or more orders from said supply of inventory.

7. The method of claim 6, wherein said supply of inventory includes on-hand inventory and in-transit inventory.

8. The method of claim 6, wherein in response to determining that said one or more orders cannot be filled from said supply of inventory, placing orders according to a selected shipping method, said selected shipping method based at least on customer order priority, transportation budget and cost associated with emission from said selected shipping method.

9. The method of claim 6, wherein said step of filling one or more orders is performed concurrently with the step of planning supply of inventory.

10. The method of claim 6, wherein said step of filling one or more orders further includes:
collecting and analyzing carbon emission data associated with a plurality of transportation modes;
checking availability of current inventory to determine whether said one or more orders can be filled from said current inventory, and filling said one or more orders from said current inventory in response to determining the availability;
checking availability of in-transit inventory to determine whether said one or more orders can be filled from said in-transit inventory, and filling said one or more orders from said in-transit inventory in response to determining the availability; and
in response to determining that said one or more orders are not filled from said current inventory or said in-transit inventory, placing an order for said one or more orders using premium shipping based on a plurality of criteria.

11. The method of claim 10, wherein said step of placing an order for said one or more orders using said premium shipping based on a plurality of criteria includes:
determining whether requested ship date associated with said one or more orders is less than lead-time for regular shipment, and in response to determining that said requested ship date is less than said lead-time for regular shipment, determining priority of said one or more orders and in response to determining that said priority meets a threshold for being high priority, determining whether premium shipping is approved for said one or more orders, and in response to determining that the premium shipping is approved, placing an order for said one or more orders using said premium shipping.

12. The method of claim 10, wherein said plurality of criteria includes requested ship date, service level agreement (SLA), transportation costs of one or more shipping modes, budget for transportation expense, realized order forecast, realized demand forecast, order backlog, inventory positions, customer priority, order priority, carbon emission associated with said one or more shipping modes, the limit on carbon emission credits, or combinations thereof.

13. The method of claim 1, wherein said steps of forecasting demand, estimating accuracy of said forecasted demand, and establishing reorder point policy are performed automatically and repeatedly.

14. The method of claim 1, wherein said steps of forecasting demand, estimating accuracy of said forecasted demand, and establishing reorder point policy are performed repeatedly every predetermined period.

15. The method of claim 1, further including:
collecting and analyzing carbon emission data associated with the plurality of supply transportation modes; and
analyzing historical forecasts and orders to estimate accuracy of the forecasted demand.

16. The method of claim 1, wherein said step of estimating accuracy of said forecasted demand includes using probability distribution.

17. The method of claim 1, wherein said step of establishing reorder point policy includes minimizing an objective function that considers at least expected total cost incurred for ordering, transportation costs of orders, inventory holding costs, backlog costs and carbon emissions associated with the plurality of supply transportation modes, subject to one or more service level constraints and one or more premium transportation budget constraints.

18. A system for optimizing order fulfillment by considering multiple supply modes, comprising:
a processor;
collection module operable to collect and analyze carbon emission data associated with a plurality of supply transportation modes;
planning process module operable to at least forecast demand, estimate accuracy of said forecasted demand, and establish reorder point policy based at least on said accuracy of said forecasted demand, the plurality of supply transportation modes, cost of carbon emissions and carbon emission budget, to plan supply of inventory; and order execution module operable to run concurrently with said planning process module, and further operable to fill one or more orders received from a customer using said supply of inventory, wherein the reorder point policy comprises reorder points determined by solving a minimization function, $$\min \sum_{m=1}^{M} \left( \sum_{k=1}^{2} c_m^k X_m^k(1, T) + \sum_{t=1}^{T} h_m E\left[ \sum_{k=1}^{2} X_m^k(1, t-l_k) - D_m(1, t) \right]^+ \right)$$

subject to constraints $$\sum_{m \in A_j} \sum_{k=1}^{2} c_m^k X_m^k(1, T) \le C_j^{max} \text{ for all product groups } j \in J,$$

$$P\left[ \sum_{k=1}^{2} X_m^k(1, t-l_k) \ge D_m(1, t) \right] \ge \alpha_m \text{ for all } m \in M \text{ and } t = 1, \ldots, T$$

wherein,

T represents total number of periods in a planning horizon, $X_m^k(1,T)$ represents total order quantity for product m using supply mode k, M represents a set of existing products indexed by m, J represents a set of product groups indexed by j, $A_j$ represents a set of product I in product group j∈J, t represents time index for period, t=1, . . . , T, where T represents number of periods, $D_{mt}$ represents demand forecast for product m in period t, $$D_m(1, t) := \sum_{s=1,\ldots t} D_{ms}$$

cumulative demand forecast for product m, $X_{mt}^k$ represents fulfillment quantity for product m using supply mode k in period t, $X_m^k(1,t)$ represents cumulative fulfillment quantity for product m using supply mode k in period t, $c_m^k$ represents carbon emission cost for each unit of product m using supply mode k, $C_j^{max}$ represents carbon emission limit for transportation of product group j, $h_m$ represents inventory cost for each unit of product m per period, $\alpha_m$ represents serviceability target for product m.

19. The system of claim 18, wherein said planning process module establishes reorder point policy based at least on said accuracy of said forecasted demand, a plurality of supply transportation modes, cost of carbon emissions and carbon emission budget, and service level target.

20. A program storage device readable by a machine, tangibly embodying a program of instructions executable by the machine to perform a method of optimizing order fulfillment by considering multiple supply modes, comprising:

planning supply of inventory, said step of planning supply of inventory comprising at least, forecasting demand, estimating accuracy of said forecasted demand, and establishing reorder point policy based at least on said accuracy of said forecasted demand, a plurality of supply transportation modes, cost of carbon emissions and limit on carbon emission credits, wherein the reorder point policy comprises reorder points determined by solving a minimization function, $$\min \sum_{m=1}^{M} \left( \sum_{k=1}^{2} c_m^k X_m^k(1, T) + \sum_{t=1}^{T} h_m E\left[ \sum_{k=1}^{2} X_m^k(1, t-l_k) - D_m(1, t) \right]^+ \right)$$

subject to constraints $$\sum_{m \in A_j} \sum_{k=1}^{2} c_m^k X_m^k(1, T) \le C_j^{max} \text{ for all product groups } j \in J,$$

$$P\left[ \sum_{k=1}^{2} X_m^k(1, t-l_k) \ge D_m(1, t) \right] \ge \alpha_m \text{ for all } m \in M \text{ and } t = 1, \ldots, T$$

wherein,

T represents total number of periods in a planning horizon, $X_m^k(1,T)$ represents total order quantity for product m using supply mode k, M represents a set of existing products indexed by m, J represents a set of product groups indexed by j, $A_j$ represents a set of product I in product group j∈J, t represents time index for period, t=1, . . . , T, where T represents number of periods, $D_{mt}$ represents demand forecast for product m in period t, $$D_m(1, t) := \sum_{s=1,\ldots t} D_{ms}$$

cumulative demand forecast for product m, $X_{mt}^k$ represents fulfillment quantity for product m using supply mode k in period t, $X_m^k(1,t)$ represents cumulative fulfillment quantity for product m using supply mode k in period t, $c_m^k$ represents carbon emission cost for each unit of product m using supply mode k, $C_j^{max}$ represents carbon emission limit for transportation of product group j, $h_m$ represents inventory cost for each unit of product m per period, $\alpha_m$ represents serviceability target for product m.

* * * * *